Dec. 20, 1949  J. J. ARABIAN  2,491,470

SLOTTING JIG

Filed Jan. 10, 1946

INVENTOR.
JACK J. ARABIAN
BY M. O. Hayes

ATTORNEY

Patented Dec. 20, 1949

2,491,470

UNITED STATES PATENT OFFICE 2,491,470

SLOTTING JIG

Jack J. Arabian, New York, N. Y.

Application January 10, 1946, Serial No. 640,292

4 Claims. (Cl. 10—5)

(Granted under the act of March 3, 1883, as amended April 30, 1928; 370 O. G. 757)

This invention relates to a slotting jig, and more specifically to a jig for slotting small articles such as screws, for example, by means of a metal saw.

An object of this invention is to provide a device for holding a small article during a slotting operation by a metal saw, and for ejecting the article from the jig when the slotting operation is completed.

A further object of this invention is to provide a jig that operates to hold a small article or workpiece firmly, and to guide the saw or other cutting tool to the work-piece during the sawing or slotting operation.

Another object is to provide a jig for holding a small article in position for any hand finishing operation, and for quickly ejecting the article from the jig when the operation is completed.

Figure 1:
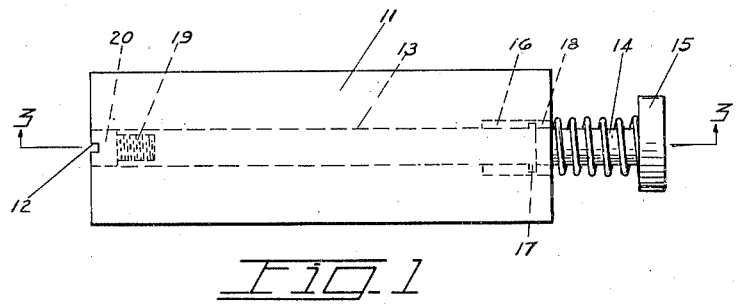
Figure 2:
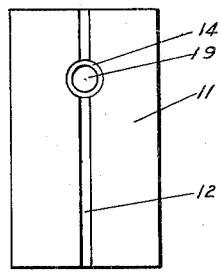
Figure 3:
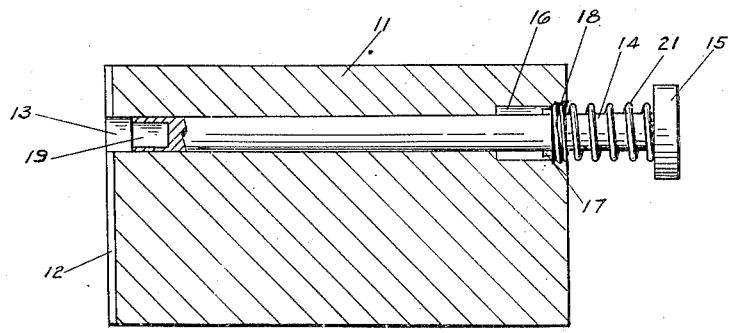

Further objects and advantages of this invention, as well as its construction, arrangement and operation will be apparent from the following description and claims in connection with the accompanying drawing, in which, Figure 1 is a side elevation of a preferred embodiment of the present invention, Figure 2 is an end elevation of the device shown in Figure 1, and Figure 3 is a cross-section taken on the line 3—3 of Figure 1.

The jig shown in the drawing comprises a solid body portion 11 having a longitudinal slot 12 extending along the center line of the end surface as shown in Figure 2.

The body portion 11 has a bore 13 extending from the face thereof that includes the slot 12 through the body to the opposite face, the slot being disposed diametrically of the bore.

A plunger 14, having a handle 15, fits the bore 13 and is mounted to slide therein. The bore 13 is enlarged slightly at 16 to provide for longitudinal movement of the stop pin 17 which extends transversely thru the plunger 14. Spring 21 urges the plunger 14 in the direction of the handle 15 and away from slot 12, but the stop pin 17 limits the movement of plunger 14 by abutting against the bushing 18 which is threaded into the outer end of the enlarged bore portion 16.

The end of the plunger 14 opposite the handle 15 has a small socket or bore 19 which, in the embodiment shown, is adapted to receive the threaded portion of a small machine screw 20 and hold the screw positioned in the bore 13, as shown in dotted lines in Figure 1. The end of the plunger 14 that contains the socket 19 is located in the bore 13 by the spring 21 acting opposed to the locating stop 17 to position the work-piece 20 for the machining operation. The slot 12 is thus located to operate as a guide for the saw blade or other machining tool that is employed to machine the slot in the work-piece 20. The size of bore 13 and the socket 19 can be modified to adapt the device for holding a large variety of small work-pieces or other objects.

In the use of the device a small object such as the machine screw 20 is inserted in the socket 19 whereby it is held in the bore 13. The jig is held in operative position with reference to a saw or other cutting tool, whereby the slot 12 acts to guide the saw into cutting engagement with the head of machine screw 20. The screw 20 is snugly and firmly held in position and the slot 12 assures that the cut is accurately made on a true diameter of the screw head.

When the slot has been completed in the screw head the plunger is pushed outwardly by means of handle 15 against the action of spring 21. While the screw 20 is still held by small bore 19 but with the head projecting slightly above the face of the jig body 11, any finishing operations can be performed on the head.

Further movement of plunger 14 will eject the screw or other small object from the jig. If this movement of the plunger is made with sufficient force the object can be completely dislodged from small bore 19 and expelled into a convenient receptacle.

Modifications and changes may be made in the above-described device without departing from the spirit and scope of this invention as set forth in the appended claims.

The invention described herein may be manufactured and used by or for the Government of the United States of America for governmental purposes without the payment of any royalties thereon or therefor.

What is claimed is:

1. A jig comprising a body, a bore extending through the body from end to end thereof, a slot in a face of the body at one end of the body and disposed diametrically of the bore, an enlarged bore extending from the bore to the other end of the body, a bushing threadedly engaging the outer end of the enlarged bore, a plunger slidably mounted in the bore and the bushing, a handle on the end of the plunger adjacent the bushing, a spring encircling the plunger between the handle and the bushing and a pin extending transversely thru the portion of the plunger within the enlarged bore.

2. A jig comprising a body, a bore extending through the body from end to end thereof, a slot in a face of the body at one end of the bore and disposed diametrically of the bore, an enlarged bore extending from the bore to the other end of the body, a bushing threadedly engaging the outer end of the enlarged bore, a plunger slidably mounted in the bore and the bushing, a handle on the end of the plunger adjacent the bushing, a spring encircling the plunger between the handle and the bushing, a pin extending transversely thru the portion of the plunger within the enlarged bore, and a small bore in the outer end of the plunger adjacent the slot.

3. A jig comprising a body, a bore extending through the body from end to end thereof, a slot in a face of the body at one end of the bore and disposed diametrically of the bore, an enlarged bore extending from the bore to the other end of the body, a bushing threadedly engaging the other end of the enlarged bore, a plunger slidably mounted in the bore and the bushing, a handle on the end of the plunger adjacent the bushing, a spring encircling the plunger between the handle and the bushing, a pin extending transversely thru the portion of the plunger within the enlarged bore, a small bore in the outer end of the plunger adjacent the slot, the outer end of the plunger being normally urged by the spring to a position within the bore and the outer end being moveable outwardly of the bore.

4. A jig for machining a work-piece comprising a body, a bore extending through the body and adapted to receive a workpiece, a plunger fitting the bore and extending therethrough to project out of one end thereof, a handle on the plunger at its projecting end, the other end of the plunger comprising an attachment for the workpiece operable to hold it positioned in the bore for the machining operation, a stop and an actuating device operating opposed to the stop to locate the end of the plunger that holds the workpiece to position the workpiece for the machining operation, a guideway in the face of the base that contains the workpiece operable to guide the tool thereto for the machining operation.

JACK J. ARABIAN.

REFERENCES CITED

The following references are of record in the file of this patent:

UNITED STATES PATENTS

| Number | Name | Date |
|---|---|---|
| 281,835 | Campbell | July 24, 1883 |
| 753,275 | Johnson | Mar. 1, 1904 |
| 1,292,821 | Lippold | Jan. 28, 1919 |
| 1,761,032 | Baker | June 3, 1930 |

FOREIGN PATENTS

| Number | Country | Date |
|---|---|---|
| 40,635 (Addition to 675,648) | France | Apr. 26, 1932 |